(12) United States Patent
Shih

(10) Patent No.: US 7,715,099 B2
(45) Date of Patent: May 11, 2010

(54) OPTICAL BIREFRINGENCE CORONAGRAPH

(75) Inventor: Chun-Ching Shih, Palos Verdes Estates, CA (US)

(73) Assignee: Northrop Grumman Space & Mission Systems Corporation, Los Angeles, CA (US)

( * ) Notice: Subject to any disclaimer, the term of this patent is extended or adjusted under 35 U.S.C. 154(b) by 344 days.

(21) Appl. No.: 11/637,517

(22) Filed: Dec. 12, 2006

(65) Prior Publication Data

US 2008/0137190 A1    Jun. 12, 2008

(51) Int. Cl.
*G02B 5/30*    (2006.01)
*G02B 27/28*    (2006.01)

(52) U.S. Cl. ................ 359/489; 359/494; 359/496; 359/500; 359/900; 216/24

(58) Field of Classification Search ............... 359/489, 359/494, 496, 500, 900; 216/24
See application file for complete search history.

(56) References Cited

U.S. PATENT DOCUMENTS

| | | | | |
|---|---|---|---|---|
| 2,412,074 A | * | 12/1946 | Benford | 356/367 |
| 2,473,857 A | * | 6/1949 | Burchell | 359/489 |
| 2,535,781 A | * | 12/1950 | Burchell | 359/489 |
| 4,286,843 A | * | 9/1981 | Reytblatt | 359/489 |
| 4,531,216 A | * | 7/1985 | Tyler | 372/9 |

(Continued)

OTHER PUBLICATIONS

Kozawa, et al.: "*Generation of a Radially Polarized Laser Beam by Use of a Conical Brewster Prism*"; Optics Letters, Nov. 15, 2005/vol. 30, No. 22; pp. 3063-3065.

(Continued)

*Primary Examiner*—Ricky D Shafer
(74) *Attorney, Agent, or Firm*—Tarolli, Sundheim, Covell & Tummino LLP

(57) ABSTRACT

Systems and methods for attenuating light from undesired sources in a coronagraph apparatus are provided. The coronagraph includes a first imaging lens that receives light representing a desired image and an undesired central image and a reimaging system that mitigates the undesired central image. The reimaging system includes a composite half-wave plate assembly that includes a plurality of angular half-wave plate sections. Each of the plurality of angular half-wave plate sections have two congruent sides that meet at an apex substantially at a center of the composite half-wave plate. A characteristic c-axis associated with a given angular half-wave plate section is aligned differently from the respective characteristic c-axes of at least two angular half-wave plate sections in substantial contact with the two sides of the given angular half-wave plate section. A fixation element engages the half-wave plate sections to maintain the angular half-wave plate sections in a desired arrangement.

8 Claims, 3 Drawing Sheets

U.S. PATENT DOCUMENTS

| | | | |
|---|---|---|---|
| 4,902,112 A * | 2/1990 | Lowe | 359/489 |
| 5,365,371 A | 11/1994 | Kamon | |
| 5,436,761 A * | 7/1995 | Kamon | 359/487 |
| 5,548,426 A * | 8/1996 | Miyashita et al. | 349/117 |
| 6,191,880 B1 * | 2/2001 | Schuster | 359/238 |
| 6,392,800 B2 | 5/2002 | Schuster | |
| 6,788,462 B2 | 9/2004 | Lesniak | |
| 6,885,502 B2 | 4/2005 | Schuster | |
| 6,943,941 B2 * | 9/2005 | Flagello et al. | 359/352 |
| 7,434,947 B2 * | 10/2008 | Shih | 359/602 |
| 2006/0146384 A1 * | 7/2006 | Schultz et al. | 359/9 |
| 2008/0137189 A1 * | 6/2008 | Shih | 359/489 |

OTHER PUBLICATIONS

Niu, et al.: "*A New Method for Generating Axially-Symmetric and Radially-Polarized Beams*"; Institute of Physics Publishing, J. Phys. D: Appl. Phys. 38 (2005) pp. 827-832.

Tovar: "*Production and Propagation of Cylindrically Polarized Laguerre-Gaussian Laser Beams*"; vol. 15, No. 10/Oct. 1998/J. Opt. Soc. Am. A, pp. 2705-2711.

Mawet, et al.: "*Annular Groove Phase Mask Coronagraph*"; The Astrophysical Journal, Nov. 10, 2005/vol. 633, pp. 1191-1200.

Foo, et al.: "*Optical Vortex Coronagraph*"; Optics Letters, vol. 30, No. 24, Dec. 15, 2005, pp. 3308-3310.

* cited by examiner

OPTICAL BIREFRINGENCE CORONAGRAPH

CROSS REFERENCE TO RELATED APPLICATIONS

This application is related to the following commonly assigned co-pending U.S. patent application Ser. No. 11/637,289, filed on Dec. 12, 2006, entitled: "Conversion of the Polarization of Light Via a Composite Half-Wave Plate,"; which is being filed contemporaneously herewith and is incorporated herein by reference.

TECHNICAL FIELD

The present invention relates generally to optical technology, and more particularly to an optical birefringence coronagraph.

BACKGROUND OF THE INVENTION

Detecting planets outside of the solar system is frequently complicated by the relative proximity of extrasolar planets to the stars they orbit. Since planets can be located only by the reflected light of their star, the star will be significantly brighter than the planet of interest, in some cases on the order of ten million times brighter. In light of the relative proximity of a planet to its star, it is necessary to attenuate the light of the star to obtain a useful image of the planet. In general, this has been accomplished through the use of coronagraphs. The design of coronagraphs can vary, including simple coronagraphs that utilize an occulting disk to block the star's light and nulling coronagraphs that use a phase mask to shift the phase of light, as opposed to directly blocking it. An occulting disk is usually used to block the sun and retrieve corona images. However, it is more suitable to use a phase mask for star systems because the entrance aperture dominates the diffraction effect of images.

SUMMARY OF THE INVENTION

In accordance with an aspect of the present invention, a coronagraph apparatus is provided. The coronagraph includes a first imaging lens that receives light representing the desired image and the undesired central image; and a reimaging system that mitigates the undesired central image. The reimaging system includes a composite half-wave plate assembly that includes a plurality of angular half-wave plate sections. Each of the plurality of angular half-wave plate sections have two congruent sides that meet at an apex. The plurality of half-wave plates are arranged such that the apexes of the plurality of angular half-wave plate sections all meet at a point substantially at a center of the composite half-wave plate, and a characteristic c-axis associated with a given angular half-wave plate section is aligned differently from the respective characteristic c-axes of at least two angular half-wave plate sections in substantial contact with the two sides of the given angular half-wave plate section. A fixation element engages the plurality of angular half-wave plate sections to maintain the angular half-wave plate sections in a desired arrangement.

In accordance with another aspect of the present invention, a method for creating a composite half-wave plate is provided. At least one half-wave plate is divided into a plurality of angular sections. The plurality of angular sections are arranged into a desired arrangement as a composite half-wave plate, such that linearly polarized light passing through composite half-wave plate is converted to one of an azimuthal, a radial, and a random polarization. The plurality of angular sections are mechanically fixed in the desired arrangement. The composite half-wave plate is then placed between a first imaging lens and a second imaging lens to provide a phase mask within the coronagraph apparatus.

In accordance with yet another aspect of the present invention, a coronagraph apparatus is provided for separating a desired image from an undesired central image having a greater intensity. A first imaging lens receives light representing the desired image and the undesired central image. A reimaging portion mitigates the undesired central image. The reimaging portion includes a composite half-wave plate that comprises a plurality of angular half-wave plate sections. Each of the plurality of angular half-wave plate sections has two congruent sides that meet at an apex, with the plurality of half-wave plates being arranged such that the apexes of the plurality of angular half-wave plate sections all meet at a point substantially at a center of the composite half-wave plate. A characteristic c-axis associated with a given angular half-wave plate section is aligned differently from the respective characteristic c-axes of at least two angular half-wave plate sections in substantial contact with the two sides of the given angular half-wave plate sections. A fixation element engages the plurality of angular half-wave plate sections to maintain the angular half-wave plate sections in a desired arrangement.

DETAILED DESCRIPTION OF INVENTION

In accordance with an aspect of the present invention, a coronagraph that utilizes a radial or azimuthal polarization of incident light to attenuate light from an undesired source is provided. In order to convert a linearly polarized beam into a radially/azimuthally polarized beam effectively, this invention employs an orientation-independent polarization rotator using a half-wave plate having a characteristic c-axis, that is an axis in a birefringent material along which the electric field portion of electromagnetic field radiation experiences extraordinary index of refraction. When passing through a half-wave plate, a linearly polarized beam will have its polarization changed to the other side of the c-axis. Mathematically, it can be written as $a'=2b-a$, where b is the angle of the c-axis, a and a' are the polarization angles of the input and output beams. The concept can be used to convert a linearly polarized beam into a "nearly" radially or azimuthally polarized beam.

Figure 1:
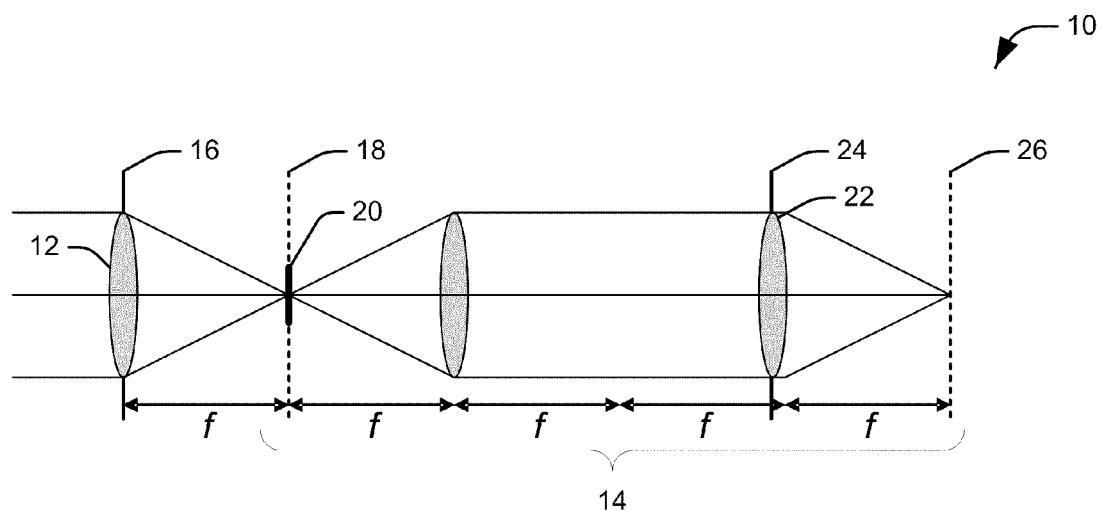
FIG. 1 illustrates a coronagraph utilizing a phase mask comprising a composite half-wave plate in accordance with an aspect of the present invention.

FIG. 1 illustrates a coronagraph 10 utilizing a phase mask comprising a composite half-wave plate in accordance with an aspect of the present invention. The illustrated coronagraph 10 consists of a first imaging lens 12 followed by a re-imaging system 34. A first pupil plane 16 defines an entrance to the coronagraph, and an image associated with the first imaging lens 12 forms at a first focal plane 18. To obtain a corona image at the second focal plane 26, a phase mask 20 can be placed at the first image to block an undesired central image (e.g., an image of a star) having a greater intensity than the desired off-axis image and a second pupil 24 can be placed at the second lens position 22 to suppress undesirable diffraction. In the typical circumstance, the undesired central image is effectively a point source, and the image at the first focal plane 18 is dominated by an Airy pattern induced by the entrance aperture.

A desired image, generally of a much lower intensity than the undesired central image, can be represented as a displaced secondary Airy pattern at the first focal plane 18. In order to suppress the primary Airy pattern at a reimaging plane 26, the phase mask 20 is placed at the first focal plane 18 that acts in concert with the second lens 22 at the second pupil plane 24 to create a null intensity on axis at the reimaging plane 26. In accordance with an aspect of the present invention, a phase mask 20 can comprise a composite half-wave plate to convert the polarization of light in an azimuthal or a radial orientation in accordance with an aspect of the present invention. As a result, the on-axis intensity of the image, and accordingly, the majority of the primary Airy pattern, will be suppressed at the reimaging plane 26.

Figure 2:
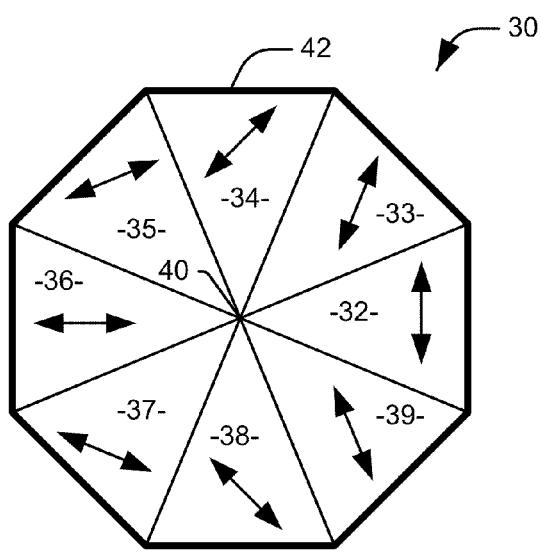
FIG. 2 illustrates an exemplary composite half-wave plate for use in a phase mask assembly in accordance with an aspect of the present invention.

FIG. 2 illustrates an exemplary composite half-wave plate 30 for use in a phase mask assembly in accordance with an aspect of the present invention. The composite half-wave plate 30 is comprised of a number of angular half-wave plate sections 32-39 that are aligned to have varying c-axis angles. The illustrated half-wave plate 30 comprises eight angular sections 32-39, but it will be appreciated that more or fewer angular sections can be utilized in accordance with an aspect of the present invention. Each angular section 32-39 has two congruent sides meeting at an apex. An outer edge of each angular sections 32-39 can take on any reasonable contour, such as an arc, a straight line, or multiple straight or curved lines, such that the angular sections are roughly triangular. The angular sections 32-39 are configured such that the apex of each angular section meets at or near a central point 40 of the half-wave plate 30. In accordance with an aspect of the present invention, the angular sections 32-39 comprising the half-wave plate 30 can be configured such that the passage of linearly polarized light through the half wave plate is converted to a radial or azimuthal orientation. To this end, the angular sections 32-39 comprising the half-wave plate can be selected such that the c-axis associated with each section can rotate by a predetermined amount at each successive section, such that the characteristic c-axis of a given angular section (e.g., 33) is different from the characteristic c-axes of the angular sections to either side (e.g., 32 and 34).

The angular sections 32-39 can be held in place by a fixation element 42 that holds the angular sections in place relative to one another. It will be appreciated that the fixation element 42 can comprise any suitable means for holding the angular sections 32-39 in place without interfering with the passage of light through the surface of the half-wave plate 30. For example, the fixation element 42 can include one or more of an adhesive, a rigid outer rim that mechanically precludes movement of the angular sections, or a frame operative to mechanically communicate with the angular sections 32-39 as to hold them in place. In the illustrated example of a half-wave plate 30, the fixation element 42 is illustrated as an outer frame that mechanically engages the angular sections 32-39, but it will be appreciated that this is merely exemplary.

In the illustrated example, the c-axes associated with the various angular sections 32-39 are selected such that the collective effect of the angular half-wave plate sections is the conversion of a linearly polarized light beam into a radially or azimuthally polarized light beam. Specifically, the c-axes associated with the various angular sections 32-39 are selected such that one cycle of rotation is observed in the represented c-axes of angular sections. For example, envision a coordinate system in which the direction of propagation for a beam of light is the z-axis, the y-axis is vertical relative to the illustrated orientation of the half-wave plate 30, and the x-axis is horizontal relative to the illustrated orientation of the half-wave plate. When a light beam that is linearly polarized along the x-axis is directed at the surface of the illustrated half-wave plate, a radially polarized light beam is produced. Similarly, when a light beam that is linearly polarized along the y-axis is directed at the surface of the illustrated half-wave plate, an azimuthally polarized light beam is produced. Since the angular sections 32-39 comprising the composite half-wave plate 30 extend to the center of the plate, the plate can be utilized to convert the entirety of a light beam, including a central region, into an azimuthal or radial polarization. In addition, the step-wise change of polarization direction between neighboring sections has negligible effects on the subsequent propagation or focusing property of the beam.

Figure 3:
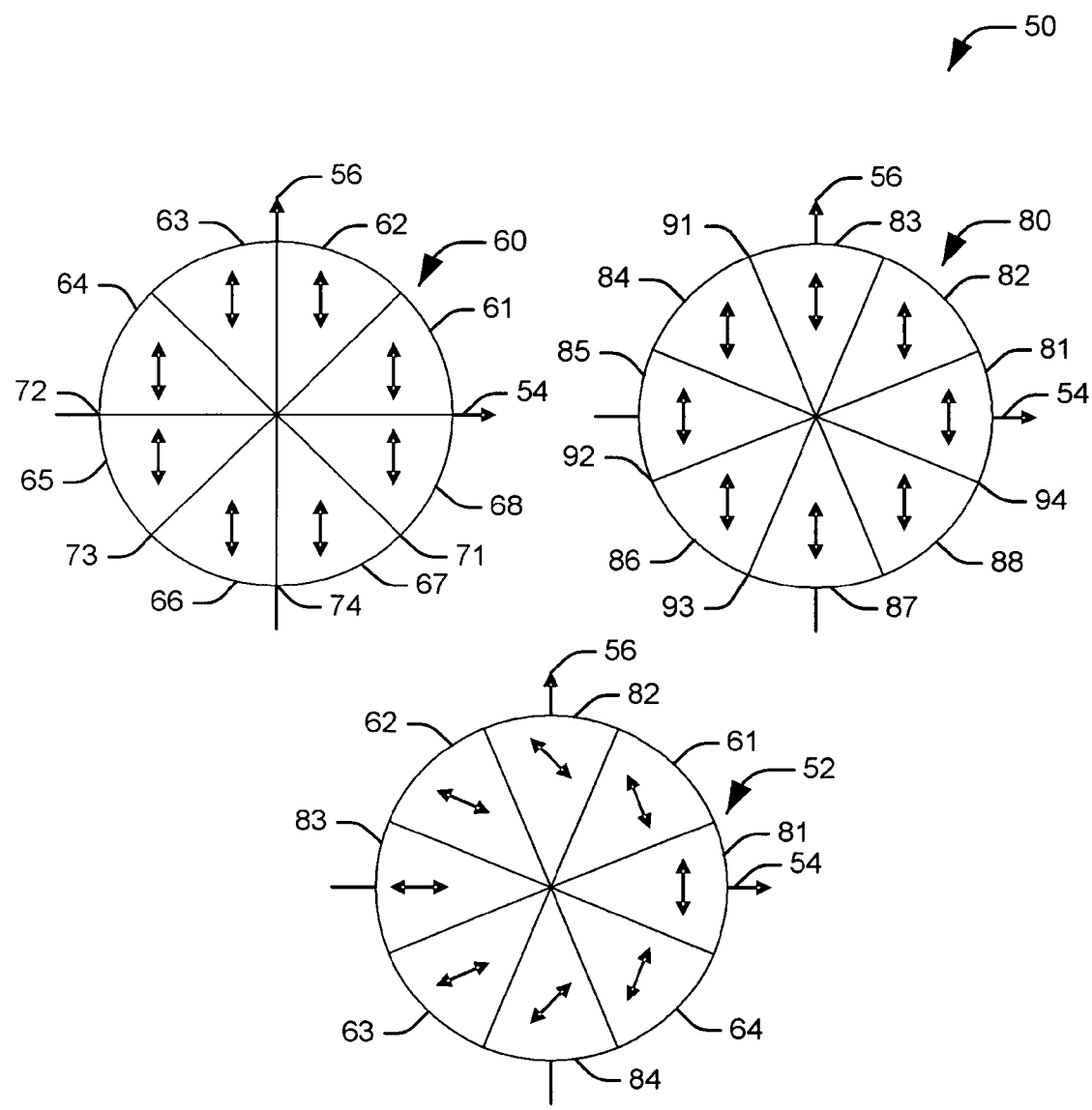
FIG. 3 provides a graphic illustration of a first exemplary process for creating a composite half-wave plate in accordance with an aspect of the present invention.

FIG. 3 provides a graphic illustration 50 of a first exemplary process for creating a composite half-wave plate 52 in accordance with an aspect of the present invention. To better illustrate the process, a common coordinate axis is utilized, comprising a horizontal axis 54 and a vertical axis 56. In the common coordinate axis, the positive end of the horizontal axis 54 represents zero degrees and the positive end of the vertical axis 56 represents ninety degrees. The composite half-wave plate 52 is comprised of a plurality of angular sections from a first circular half-wave plate 60, comprising a first plurality of angular sections 61-68 generated by a first plurality of straight line divisions 71-74 made along diameters of the first circular half-wave plate, and a second circular half-wave plate 80, comprising a plurality of angular sections 81-88 generated by a second plurality of straight line divisions 91-94 made along diameters of the second circular half-wave plate. For the purpose of example, both plates 60 and 80 have a c-axis aligned with the vertical axis 62. It will be appreciated that the divisions can be made by any appropriate mechanism for cutting or otherwise separating birefringent materials.

In the first half-wave plate 60, the angular divisions 71-74 can comprise a first division 71 at 135°, a second division 72 along the horizontal axis, a third division 73 at 45°, and a fourth division 74 along the vertical axis. In the second half-wave plate 80, the angular divisions 91-94 can comprise a first division 91 at 112.5°, a second division 92 at 22.5°, a third division 93 at 67.5°, and a fourth division 94 at 157.5°. Accordingly, eight segments, each taking in forty-five degrees of arc, are generated, and segments from the two half-wave plates 60 and 80 are offset by 22.5°. Speaking generally, for N divisions, angular sections encompassing 180/N degrees of arc will be formed, and angular sections from the two half-wave plates 60 and 80 will be offset by 90/N degrees. Once the two half-wave plates 60 and 80 have been segmented into their respective plurality of angular sections 61-68 and 81-88, the angular sections from the two plates can be rearranged to form the composite plate.

To achieve the desired c-axis rotation within the composite half-wave plate 52, a selected subset of angular sections 61-64 and 81-84 are utilized to create the composite plate. A first angular section from the second half-wave plate 80 is centered on the positive end of the horizontal axis, at the same position as it inhabited in the second half-wave plate. A first angular section 61 from the first half-wave plate 60 is placed on the counterclockwise edge of the previous angular section 81, in a position shifted 22.5° counterclockwise from its original position in the first half-wave plate. A second angular section 82 from the second half-wave plate 80 is placed on the counterclockwise edge of the previous angular section 61, at a position 45° from its original position in the second half-wave plate. Similarly, a second angular section 62 from the first half-wave plate 60 is placed on the counterclockwise edge of the previous angular section 81, at a position 67.5° from its original position in the first half-wave plate. This continues, with the segment to be placed next being selected to ensure a 22.5° rotation of the c-axis associated with each successive segment. The final segment 64 is placed at a position 157.5° from its original position, such that the c-axis rotates a complete cycle in one circuit around the composite half-wave plate 52. In other words, the c-axis of the first angular half-wave plate section 81 represents a first angle and the c-axis of a fifth angular half-wave plate section 83 that is opposite the first angular half-wave plate section represents a second angle substantially perpendicular to the first angle. Once the angular sections 61-64 and 81-84 are arranged in the desired manner, they are mechanically fixed into place via an appropriate fixation element (e.g., a frame, an adhesive, etc.).

Figure 4:
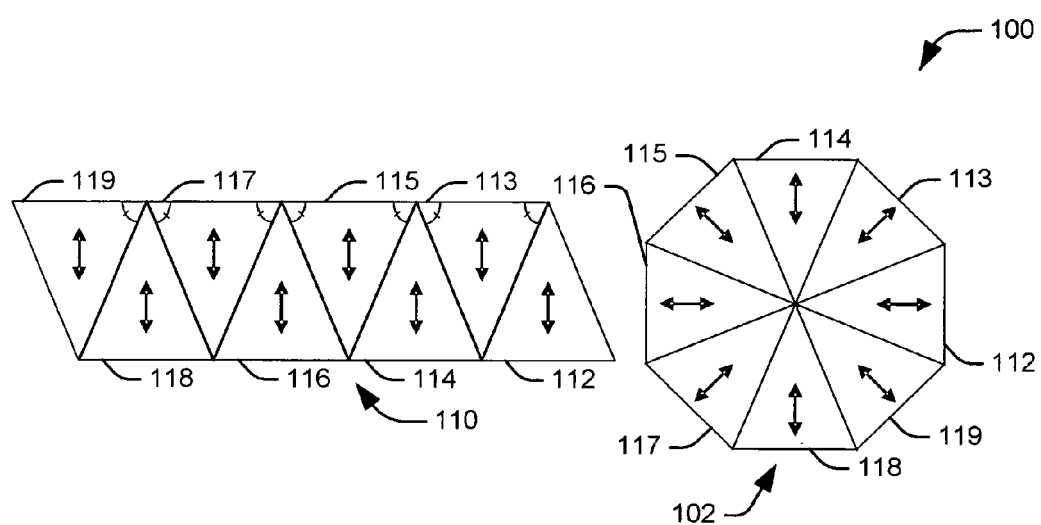
FIG. 4 provides a graphic illustration of a second exemplary process for creating a composite half-wave plate in accordance with an aspect of the present invention.

FIG. 4 provides a graphic illustration 100 of a second exemplary process for creating a composite half-wave plate 102 in accordance with an aspect of the present invention. In accordance with an aspect of the present invention, a parallelogram-shaped piece of birefringent material 110 can be divided into a plurality of angular half-wave plate sections 112-119. In the illustrated example, the angular half-wave plate sections 112-119 are divided via a plurality of cuts, each making about a 67.5° angle with the upper parallel edge of the parallelogram. The resulting angular half-wave sections are shaped as isosceles triangles. The cuts can be conceptualized as two sets of parallel cuts, with a first set of parallel cuts running from left to right from the bottom parallel edge of the parallelogram to the top parallel edge, and a second set of parallel cuts running right to left from the bottom edge to the top edge.

The triangular sections 112-119 can then be placed together form an octagonal pattern, with the vertex between the two contiguous sides of each isosceles triangles being oriented toward the center of the octagon, such that the respective vertices associated with the plurality of angular half-wave plate sections 112-119 are in mutual contact. In the resulting pattern, the c-axis associated with the plurality of angular half-wave plate sections 112-119 rotates two complete cycles in one circuit around the half-wave plate 102. In other words, the c-axis of the first angular half-wave plate section 112 represents a first angle and the c-axis of a fifth angular half-wave plate section 116 that is opposite the first angular half-wave plate section represents a second angle substantially equal to the first angle. Once the angular sections 112-119 are arranged in the desired manner, they are mechanically fixed into place via an appropriate fixation element (e.g., a frame, an adhesive, etc.).

It will be appreciated that the composite half-wave plate 102, since it represents two complete cycles of rotation of the c-axis, would not be used for generating radial or azimuthal polarizations of light. Instead, linearly polarized light passing through the half-wave plate 102 would assume a mixed polarization state, where the polarization of the light demonstrates an azimuthal variation of two or more complete cycles within the beam.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

The invention claimed is:

1. A method for constructing a coronagraph apparatus comprising:
   dividing at least one half-wave plate into a plurality of angular sections;
   arranging the angular sections into a desired arrangement as a composite half-wave plate, such that linearly polarized light passing through composite half-wave plate is converted to one of an azimuthal, a radial, and a random polarization; and
   mechanically fixing the angular sections in the desired arrangement; and
   placing the composite half-wave plate between a first imaging lens and a second imaging lens to provide a phase mask within the coronagraph apparatus.

2. The method of claim 1, wherein the at least one half-wave plate comprises a single half-wave plate in the shape of a parallelogram comprising first and second parallel boundaries and dividing the at least one half-wave plate comprises making a first set of parallel divisions from the first parallel boundary of the plate to the second parallel boundary of the plate at a first angle relative to the first parallel boundary and making a second set of parallel divisions from the first parallel boundary of the plate to the second parallel boundary of the plate at a second angle relative to the first parallel boundary.

3. The method of claim 2, wherein no division from the first set of parallel divisions intersects a division from the second set of parallel divisions at any point other than the first and second parallel boundaries.

4. The method of claim 2, wherein the first angle and the second angle are congruent and each of the first set of divisions intersects at least one of the second set of parallel divisions at one of the first and second parallel boundaries, such that each of the plurality of angular sections is shaped as an isosceles triangle.

5. The method of claim 1, wherein the at least one half-wave comprises a first circular half-wave plate that is divided to generate a first set of angular sections and a second circular half-wave plate that is divided to generate a second set of angular sections, and dividing one of said circular half-wave plates into a set of angular sections comprises dividing the circular half-wave plate among N diameters of the circular half-wave plate, where N is an integer greater than one and the at least two diameters are evenly spaced such that each angular section takes a portion of an arc of a circle equal, in degrees, to one-hundred eighty divided by N.

6. The method of claim 5, wherein the composite half-wave plate is comprised of a subset of the first set of angular sections and a subset of the second set of angular sections, such that at least one angular section from the first set of angular sections and at least one angular section from the second set of angular sections are not part of the plurality of angular sections arranged as part of the composite half-wave plate.

7. The method of claim 5, wherein the first set of angular sections and the second set of angular sections are arranged alternately, such that a given angular section from the first set of angular sections will be situated between two angular sections from the second set of angular sections, and a given angular section from the second set of angular sections will be situated between two angular sections from the first set of angular sections.

8. The method of claim 5, wherein each of the N diameters associated with the first circular half-wave plate is offset by 90/N degrees from a corresponding diameter associated with the second circular half-wave plate.

* * * * *